UNITED STATES PATENT OFFICE.

WALLACE PATTEN COHOE, OF TORONTO, ONTARIO, CANADA, ASSIGNOR OF ONE-THIRD TO THE WILLIAM DAVIES COMPANY, LIMITED, OF TORONTO, CANADA, A CORPORATION OF CANADA, AND ONE-THIRD TO EDWARD CAREY FOX, OF TORONTO, CANADA.

CASING FOR SAUSAGES.

1,158,400. Specification of Letters Patent. Patented Oct. 26, 1915.

No Drawing. Application filed December 31, 1913. Serial No. 809,731.

*To all whom it may concern:*

Be it known that I, WALLACE PATTEN COHOE, a citizen of the Dominion of Canada, residing in the city of Toronto, county of York, Province of Ontario, Dominion of Canada, have invented certain new and useful Improvements in Casings for Sausages; and I do hereby declare the following to be a full, clear, and exact description of the invention, such as will enable others skilled in the art to which it appertains to make and use the same.

In Letters Patent of the United States No. 1,070,776, granted to Wallace Patten Cohoe and Edward Carey Fox, under date of August 19, 1913, there is described and claimed certain improvements in casings for sausages, said casings consisting essentially of dried cellulose hydrate.

My present invention relates to a further development of the manufacture of sausage casings, and has for its object the two-fold purpose of increasing the elasticity of the casing walls and of increasing their water-proof qualities.

In those instances where the main purpose is to increase the elasticity of the walls of the casing, I prefer to combine with the cellulose hydrate, in homogeneous admixture therewith, a percentage of gelatin, and, ultimately, to treat the casing made from the mixture, by means of any suitable hardening agent, as, for instance, alum, formaldehyde, tannin, or the like.

The gelatin is employed in proportion varying from 5% to 25% by weight of the cellulose hydrate (calculated dry) in the final product. Assuming that the cellulose hydrate is viscose, a concentrated solution, in water, of the gelatin may be added to the viscose, after the latter is prepared and ready for use, and the two ingredients may then be thoroughly and homogeneously mixed preparatory to the making of the casings therefrom. It is preferable, however, in making up the mixture, to first dissolve the gelatin in water and add the mercerized wood-pulp after it has been converted by the carbon bisulfid. In either case, the casing is to be extruded, in the form of a tube of wall thickness appropriate to the manufacture of sausage casings, and, after such extrusion, the gelatin constituent of the extruded tube is hardened by any of the reagents hereinbefore specified or their equivalents, and either after or during coagulation. The completed casing is of increased elasticity. Its tendency to weaken in water is decreased and its water-proof quality enhanced.

Instead of using gelatin for improving the water-proof qualities of the casing, this may likewise be effected to even greater advantage by means of incorporating therein a fatty acid, so as to make it impermeable to water. To this end, there may be incorporated with the viscose solution, a suitable stearate, as for instance, potassium stearate. The mixture is then extruded in the form of the desired tubular casing, is coagulated, and the coagulated casing is received in a bath of salt solution (for instance chlorid of sodium) in which neither the viscose nor the potassium stearate is soluble. The casing is allowed to remain in the salt solution until the coagulated viscose has reverted to cellulose hydrate. From the casing as thus far produced, either an edible or a non-edible product can be obtained. Thus, to make an edible product consisting of cellulose hydrate having incorporated therein a fatty acid, the tubular casing after emerging from the bath of salt solution referred to is treated with a weak acid or an acid salt, which will unite with the basic radical of the soap, leaving behind the fatty acid in intimate contact with the cellulose hydrate. The casing may then be finished in any suitable manner.

If the casing is not to be edible, but is to be so treated as to make it more or less resistant to water, it may be treated (instead of with a weak acid), with a solution of a salt of a metal of such nature as to produce insoluble soap in intimate mixture with the cellulose hydrate. For instance, the use of calcium chlorid as such salt, would result in the precipitation of insoluble calcium stearate within the mass of the cellulose hydrate.

As stated in Patent No. 1,070,776, hereinbefore referred to, in drying the cellulose hydrate, the dehydration is designed in the first place to give to the tube the requisite strength to prepare it for the reception of its sausage meat contents. This main purpose will be satisfied by carrying the dehydration to this extent, and, within the meaning of the present specification, the product may then be regarded as "dried" cellulose hydrate even though the drying is not carried further. It is preferred, however, not only to dry it sufficiently to give it the strength desired, but to dry it so thoroughly that it can be kept for a long period of time without deterioration. In this preferred condition, with the water of hydration substantially driven off, the cellulose hydrate is probably converted to substantially pure cellulose, and it will, of course, be understood that, in the sense of the present specification, this preferred maximum degree of dehydration is likewise included.

Having thus described my invention, what I claim is:—

1. A thin-walled tube of dried cellulose hydrate associated with a water-proofing ingredient.

2. A thin-walled tube of dried cellulose hydrate containing an ingredient which imparts to it additional elasticity and additional water-proof qualities.

3. A thin-walled tube of dried cellulose hydrate associated with an ingredient insoluble in water.

4. A thin-walled tube of dried cellulose hydrate associated with an edible ingredient insoluble in water.

In testimony whereof I affix my signature, in presence of two witnesses.

WALLACE PATTEN COHOE.

Witnesses:
 John C. Pennie,
 H. E. Johnson.